United States Patent [19]

Hornung

[11] 3,991,615
[45] Nov. 16, 1976

[54] MICROWAVE OVEN FOOD TEMPERATURE-SENSING PROBE ASSEMBLY

[75] Inventor: Richard E. Hornung, Louisville, Ky.

[73] Assignee: General Electric Company, Louisville, Ky.

[22] Filed: Dec. 22, 1975

[21] Appl. No.: 643,109

[52] U.S. Cl. .............................. 73/352; 73/362 AR; 219/10.55 R
[51] Int. Cl.² ...................... G01K 1/08; G01K 7/24; H05B 9/06
[58] Field of Search ........... 73/339 R, 352, 362 AR; 99/342, 421 TP; 219/10.55 R, 10.55 F, 10.55 M; 250/505; 340/228 R

[56] References Cited
UNITED STATES PATENTS

| 2,607,872 | 8/1952 | Enabnit | 73/352 X |
| 3,431,381 | 3/1969 | Anderson | 219/10.55 F |
| 3,606,792 | 9/1971 | Yoshimoto | 73/352 X |
| 3,815,113 | 6/1974 | Welch | 73/352 X |

Primary Examiner—Richard C. Queisser
Assistant Examiner—John S. Appleman
Attorney, Agent, or Firm—Steven C. Schnedler; Francis H. Boos

[57] ABSTRACT

A food temperature-sensing probe assembly for monitoring the internal temperature of food while it is being cooked in a microwave oven includes a disc-like reflector mounted at a fixed position on the probe housing a predetermined distance from the tip of the probe housing. The probe housing is adapted to be driven into the food so that the reflector is adjacent to, but spaced from, the food. The reflector serves to prevent overcooking of the food in a region immediately adjacent the probe. An indicator on the probe housing shows the minimum recommended insertion depth of the probe into the food, and therefore the maximum reflector-to-food spacing, for effective shielding. The reflector and the handle may be formed as a single assembly held together by insert molding.

8 Claims, 5 Drawing Figures

MICROWAVE OVEN FOOD TEMPERATURE-SENSING PROBE ASSEMBLY

BACKGROUND OF THE INVENTION

1. Field of the Invention

The present invention relates to a microwave oven food temperature sensing probe assembly which prevents overcooking of the food in a region immediately adjacent the probe. The present invention is an improvement of the probe assembly disclosed and claimed in copending application Ser. No. 643,092, filed Dec. 22, 1975, concurrently herewith, by Flora L. Meek and Richard E. Hornung, entitled "Microwave Oven Food Temperature Sensing Probe Assembly Including a Reflector," and assigned to the same assignee as the present invention.

2. Description of the Prior Art

Electric thermometer probes which monitor the internal temperature of the food while it is being cooked have been developed for use in microwave ovens. Examples of such probes, adapted for use in microwave ovens, are disclosed and claimed in copending application Ser. No. 616,049, filed Sept. 23, 1975, by David Y. Chen and Louis H. Fitzmayer, and in copending application Ser. No. 616,050, filed Sept. 23, 1975, by Louis H. Fitzmayer, each entitled "Food Thermometer for Microwave Oven," and assigned to the same assignee as the present invention. Such probes comprising a needle-like probe adapted to be driven into the food and a temperature-sensing element, such as a thermistor, positioned internally of the probe housing near the distal end thereof. A flexible shielded cable connects the thermistor to circuitry which is responsive to thermally-induced changes in its resistance. The cable shield is electrically connected at one end of the probe housing and at the other end to a wall of the oven cooking cavity. In the embodiments disclosed in the above-mentioned Chen and Fitzmayer application Ser. No. 616,049, the total effective electrical length of the probe and cable, measured along the cable and probe from the cooking cavity wall to the distal end of the probe, is selected to be approximately equal to $n\lambda/2$, where $n$ is any integer and $\lambda$ is the wavelength of the microwaves being used to cook the food in the oven. Such a probe and cable assembly may successfully be operated in a microwave oven with minimal direct heating of the probe and cable by the microwave energy.

In general, probes of the above-described type operate satisfactorily and do minimize problems caused by direct heating of the probe and cable by the microwave energy. However, when they are used to monitor the internal temperature of certain foods, including meats and baked potatoes, overcooking of the food in a cone-shaped region immediately adjacent the probe (generally along the length of the probe) sometimes occurs. This is considered undesirable from the standpoint of appearance of the food after it has been cooked. Further, the temperature-sensing probe necessarily responds to the temperature of the food in the region immediately adjacent the probe. When the food in this immediately adjacent region cooks faster than the other regions of the food, there is an indication of doneness before the bulk of the food (all the other regions within the food) is fully cooked to the desired degree of doneness. The condition which results in overcooking of the food in the region immediately adjacent the probe has been termed "feed in" because the cable and probe seemingly pick up microwave energy present within the cooking cavity and feed or direct the energy into the food along the length of the probe.

The above-described "feed in" effect is to be distinguished from a premature indication of doneness due to direct heating of the probe by the microwave energy, one of the problems to which the inventions comprising the subject matter of the above-mentioned copending Chen and Fitzmayer application Ser. No. 616,049 and the abovementioned Fitzmayer application Ser. No. 616,050 are directed. When a "feed in" problem occurs, the probe may be accurately sensing temperature; the temperature of the food which the probe is sensing is simply not the temperature of the food as a whole.

The above-mentioned Meek and Hornung application Ser. No. 643,092 discloses and claims a microwave oven food temperature-sensing probe assembly which, in order to eliminate the "feed in" problem, includes a disc-shaped reflector positioned along the probe housing. The reflector-to-food spacing can be adjusted to achieve a condition in which an optimum amount of microwave energy enters the food in the region immediately adjacent the probe housing. If the reflector is not sufficiently close to the surface of the food, insufficient shielding takes place and the "feed in" problem returns. By the present invention, there is provided an improved form of the Meek and Hornung probe and the reflector assembly which is convenient to use and not prone to being improperly adjusted.

SUMMARY OF THE INVENTION

It is an object of the invention to provide a microwave oven food temperature-sensing probe assembly which includes a reflector to minimize feed in and which is convenient to use.

It is another object of the invention to provide such a probe assembly which includes an indicator to show the minimum recommended insertion depth in a simple and effective manner.

It is still another object of the invention to provide such a probe assembly including a unitary reflector and handle assembly which is trouble-free and convenient to manufacture.

These and other objects are accomplished by the present invention in which there is provided a needle-like probe adapted for insertion into the food to be cooked, a temperature-sensing element being positioned internally of the probe housing near the tip thereof. A flexible shielded cable is provided for connecting the temperature-sensing element to suitable circuitry. The cable shield is electrically connected at one end to the probe housing and is adpated at the other end for connection to a wall of the microwave oven cooking cavity. An electrically-conductive reflector is mounted at a fixed position on the probe housing a predetermined distance from the tip of the probe housing. There is also provided an indicator on the probe housing to show the minimum recommended insertion depth of the probe housing into the food. The reflector and handle may be formed as an integral assembly held together by insert molding.

The term "reflector" is used in reference to the structure described herein on the assumed theory of operation that the structure operates to reflect microwave energy propagating along the cable towards the probe (and the food) back away from the probe (and the food) towards the oven wall end of the cable. While the explanation of the invention herein is believed to be correct, it is realized that other, presently unappreciated, principles of operation may be applicable and that, in such event, the "reflector," as described herein, may not actually be functioning as a reflector in the usual sense of the word. If such is ultimately deemed to be the case, then the term "reflector" is intended, nevertheless, to mean the structure as described herein and its equivalents.

BRIEF DESCRIPTION OF THE DRAWINGS

While the novel features of the invention are set forth with particularity in the appended claims, the invention, as to organization and content, will be better understood and appreciated, along with other objects and features thereof, from the following detailed description taken in conjunction with the drawings, in which:

DESCRIPTION OF THE PREFERRED EMBODIMENT

Figure 1:
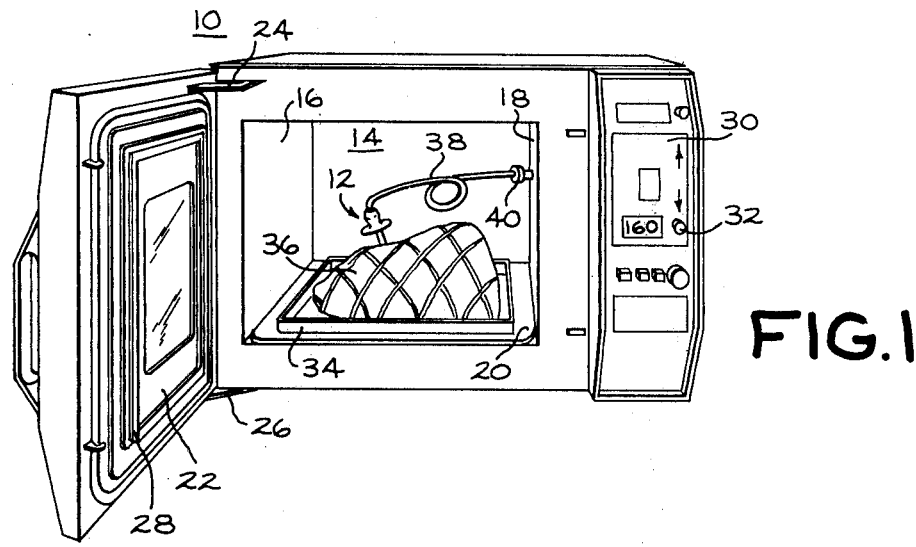
FIG. 1 is a front perspective view of a countertop microwave oven shown with the oven door open and illustrating a portion of a food temperature-sensing probe assembly embodying the principles of the present invention.

Referring first to FIG. 1, there is illustrated a countertop microwave oven, generally designated by the numeral 10, including a food temperature-sensing probe assembly 12 constructed in accordance with and embodying features of the present invention. The oven 10 includes a cooking cavity generally designated at 14, defined by side walls 16 and 18, a top wall (not shown), a bottom 20, and a door 22. The door 22 is shown in its open position and is hingedly supported at the left side by hinges 24 and 26. The door 22 also includes a conventional microwave energy seal, shown generally at 28, to prevent the escape of microwave energy from the cooking cavity 14. The oven 10 further includes a control panel 30 which includes a temperature-setting control 32.

As is conventional, the oven 10 is also provided with a magnetron (not shown) for generating microwaves of a predetermined frequency, preferably at a nominal frequency of 2450 MHz. The oven 10 further includes a waveguide (not shown) for transmitting the microwave energy from the output of the magnetron to the interior of the cooking cavity 14.

Within the cooking cavity 14, there is shown a shallow container 34 constructed of a material transparent to microwaves, such as a Pyrex dish, containing therein a piece of food 36, shown for purposes of illustration as a half of a ham. The ham 36 is to be cooked to an internal temperature of approximately 160° F. A portion of the probe assembly 12 is inserted into the ham 36 and is connected to control circuitry (not shown) contained within the oven by means of a flexible shielded cable 38 and a connector 40 mounted on the oven side wall 18. Details of suitable circuitry which may be used in conjunction with the probe assembly 12 is disclosed in copending application Ser. No. 624,336, filed Oct. 21, 1975, by Richard E. Hornung, entitled "Food Temperature Responsive Control Apparatus," and assigned to the same assignee as the present invention. Preferably, the circuitry serves to turn off the magnetron and operate an audible indicator when the internal temperature of the ham 36 reaches the temperature set on the temperature-setting control 32.

Figure 2:
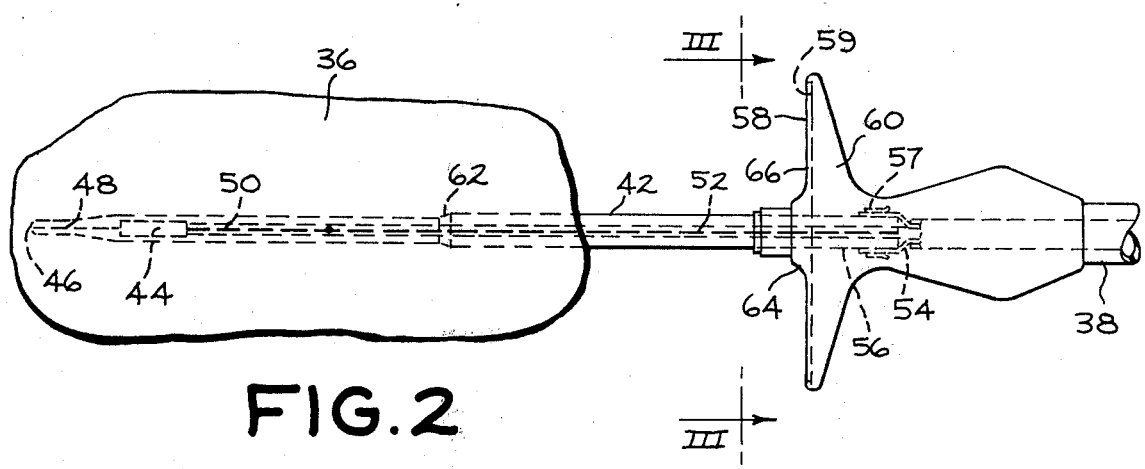
FIG. 2 is an enlarged side elevational view of the temperature-sensing probe shown in FIG. 1.
Figure 3:
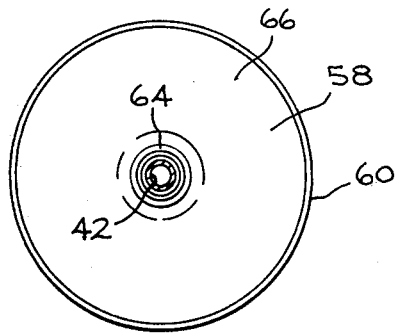
FIG. 3 is a sectional view along the line III—III of FIG. 2 illustrating the disc-like shape of the reflector.

Referring now to FIGS. 2 and 3, there are shown additional details of the probe assembly 12, which is only partially shown in FIG. 1. The probe assembly 12 includes a tubular electrically-conductive housing 42 surrounding a temperature-sensing element such as a thermistor 44 (shown in broken lines) located internally of the housing 42 near the distal end or tip 46 thereof. While a tubular probe housing having a circular cross section is shown, it will be apparent that other cross sections, such as square or hexagonal, may be employed without departing from the scope of the invention. One thermistor lead 48 is electrically and thermally connected to the probe housing 42 adjacent the tip 46. As is conventional, heat conduction to the thermistor 44 is primarily along the lead 48.

The flexible shielded cable 38 serves to electrically connect the thermistor 44 to the circuitry (not shown) and is preferably a coaxial cable. As is described in greater detail in the above-mentioned copending Chen and Fitzmayer application Ser. No. 616,049, alternative forms for the flexible shielded cable 38 are possible. Examples are a two-conductor shielded cable having two conductors and an outer shield, or, a flexible hollow tubular cable shield and a single inner conductor passing therethrough, but not necessarily centered axially.

The other thermistor lead 50 is electrically connected to the inner conductor 52 (shown in broken lines) of the cable 38 at one end thereof. At the same end of the cable 38, the braided cable shield 54 (shown in broken lines) is electrically connected to a connection end 56 (broken lines) of the probe housing 42 by fanning the braid slightly to increase its diameter and slipping the braid over the end 56 of the housing 42. A collar 57 is then crimped over the connection to securely hold the shield 54 to the housing 42. The probe housing 42 and the cable shield 54 thereby cooperate to form a continuous conductive sheath from the tip 46 of the probe housing 42 to the other end of the cable 38. At the other end of the cable 38, the cable shield 54 is electrically connected through the connector 40 to the side wall 18.

For a temperature-sensing probe assembly which is to be used in a microwave oven, it is preferable to make the total effective electrical length of the probe and the cable, measured along the cable 38 and the probe housing 42 from the cooking cavity wall 18 to the distal end or tip 46, approximately equal to $n\lambda 2$, where $n$ is any integer and $\lambda$ is the wavelength of microwave energy being used to cook the food, as is taught by the above-mentioned Chen and Fitzmayer application Ser. No. 616,049. As is more fully explained in the Chen and Fitzmayer application, when the total effective electrical length is so selected, heating of the probe and cable by direct action of the microwave energy is minimized. Therefore, for best results, the length should be so selected. It is believed, however, that substantial benefits of the present invention may still be obtained when the total effective electrical length of the probe and cable is other than that which is taught in the Chen and Fitzmayer applicantion.

In accordance with the present invention, the probe assembly 12 additionally includes an electrically conductive reflector 58 mounted at a fixed position on the probe housing 42. The reflector 58 is located a predetermined fixed distance from the tip 46 and preferably in the general form of a disc, as shown. In the embodiment of FIGS. 2 and 3, the reflector 58 is fitted into a recess in a face portion 59 of a handle 60 made of insulating material.

As is described in the copending Meek and Hornung application Ser. No. 643,092, a minimum effective reflector diameter should be at least 1.25 inches. A practical reflector diameter has been found to be 1.6 inches.

The shielding effect produced by the reflector 58 varies, both with reflector diameter and with reflector-to-food spacing. The shielding effect increases with increased reflector diameter and with decreased reflector-to-food spacing. Since, for a particular probe, the reflector diameter is fixed, there is a point at which the reflector-to-food spacing becomes too great for the reflector to function effectively, and excessive "feed in" occurs. For best results, greater reflector-to-food spacing is not recommended. This point of maximum recommended reflector-to-food spacing may also be expressed as a minimum recommended insertion depth because, as will be apparent, as the probe housing 42 is inserted further into the food 36, the reflector-to-food spacing decreases.

In order to show the minimum recommended insertion depth of the probe housing 42 into the food 36, a minimum insertion depth indicator 62 is included on the housing 42. In the illustrated embodiment, the indicator 62 comprises an enlargement in diameter of the housing 42, the larger diameter portion of the housing 42 being from the indicator 62 to the reflector 58. It will be apparent that other forms of indicator could be employed, such as a colored stripe, an indentation, or a bulge.

As a rule of thumb, it has been found that the reflector diameter and the distance between the reflector 58 and the recommended minimum insertion depth indicator 62 are approximately related as expressed by the formula:

(reflector diameter) + (reflector to indicator spacing) = $\frac{3}{4} \lambda$.

where $\lambda$ is the wavelength of the microwave energy used to cook the food 36 in the oven 10.

For a microwave frequency of 2450 MHz, $\lambda$ is approximately equal to 4.8 inches, and $\frac{3}{4} \lambda$ then equals approximately 3.6 inches. In accordance with the above formula, for a convenient reflector diameter of 1.6 inches, the distance between the reflector 58 and the minimum insertion depth indicator 62 should be approximately 2 inches.

For the same microwave frequency, it has been found satisfactory to make the distance between the reflector 58 and the probe tip 46 approximately equal to $\frac{7}{8} \lambda$. At 2450 MHz, $\frac{7}{8} \lambda$ is approximately equal to 4.4 inches.

In the illustrated embodiments of the invention, the probe assembly 12 also includes a spacer 64 positioned on the reflector side 66 facing the food 36 to control the maximum insertion depth of the probe housing 42 into the food 36. The indicator 62 and the spacer 64 cooperate to define a range of recommended insertion depths. The spacer 64, however, forms no part of the present invention, but, rather, is the subject matter of copending application Ser. No. 643,092, filed Dec. 22, 1975, concurrently herewith, by Louis H. Fitzmayer and Richard E. Hornung, and also entitled "Microwave Oven Food Temperature-Sensing Probe Assembly."

Figure 4:
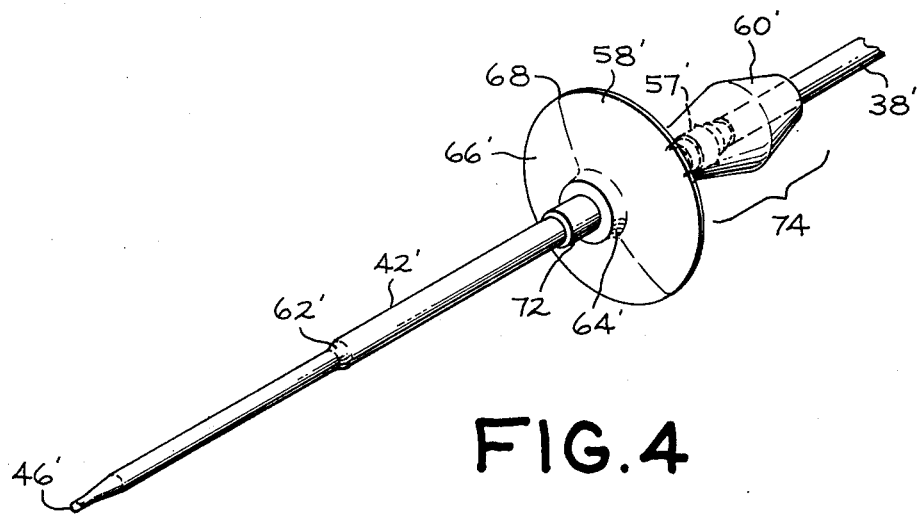
FIG. 4 is a perspective view illustrating an alternative embodiment of the present invention.
Figure 5:
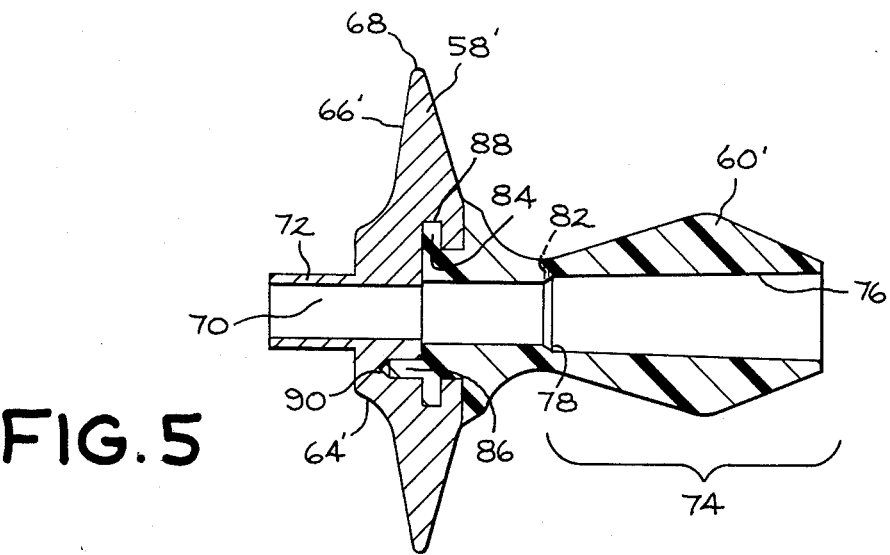
FIG. 5 is a cross-sectional view of the integral reflector and handle assembly of the probe illustrated in FIG. 4.

Referring now to FIGS. 4 and 5, there is shown an alternative form of the present invention including a unitary handle and reflector assembly, details of which are seen best in FIG. 5. In the embodiment of the invention illustrated in FIGS. 4 and 5, the elements which are unchanged from the previously-described embodiments are designated by primed reference numerals, and a detailed description thereof will not be repeated.

In FIGS. 4 and 5, the reflector 58' comprises a solid conductive body which is generally disc-shaped, but which has a greater thickness in the center than at the edge 68. In order to minimize corona and arcing, the reflector edge 68 is rounded, thereby reducing the electric field intensity. The reflector 58' has an axial bore 70 for receiving an end of the cable 38' and the probe housing 42'. Attached to the reflector side 66' and extending outwardly therefrom is a tubular attachment portion 72 which is attached to the probe housing 42' (FIG. 4) by reducing the diameter of the attachment portion 72 by swaging.

The handle 60' is made of insulating material, such as plastic, and includes a gripping portion 74 for manual manipulation. The handle 60' further includes an axial bore 76 which is enlarged beginning at a point 78 to accommodate the increased diameter of the collar 57'. Also included is a radial sealant injection hole 82 for injecting a sealant, for example RTV, into the bore 76 to prevent moisture from entering the probe housing 42'.

The reflector 58' and the handle 60' are held together by insert molding with the axial bores 70 and 76 in alignment. Projections from the handle 60', such as a rib 84 and a member 86, engage mating cavities 88 and 90 in the reflector 58' to keep the handle 60' and the reflector 58' together and to prevent relative rotation.

Having described preferred embodiments of the invention, the operation thereof will now be described. In preparation for cooking, the probe housing 42 is inserted into the food 36 to a position such that the outer boundary of the food 36 is between the minimum insertion depth indicator 62 and the maximum insertion depth indicator or spacer 64.

It is believed that, without the reflector 58, microwave energy is picked up by the cable 38 and the probe housing 42 and follows along the cable 38 and probe housing 42 to be directed and concentrated into the food 36 in the region immediately adjacent the probe housing 42. The reflector serves to reflect a controlled amount of microwave energy back up the cable 38 toward the connector 40, thereby preventing excessive microwave energy from reaching the food 36.

When the relationship between the reflector diameter and the distance between the reflector 58 and the indicator 62 is selected as described herein, the amount of feed in remains within acceptable limits for the recommended range of insertion depth.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of this invention.

What is claimed is:

1. A temperature-sensing probe assembly for monitoring the internal temperature of food being cooked in the cooking cavity of a microwave oven, said probe assembly comprising:
   a. a probe adapted for insertion into food to be cooked, said probe including an elongated conductive housing, the tip end of which is closed and shaped to facilitate insertion into the food, and said probe further including a temperature-sensing electrical element positioned internally of the housing near the tip end;
   b. a flexible shielded cable for connecting said electrical element to circuitry responsive to thermally-induced changes in a characteristic of said electrical element, the cable shield being electrically connected at one end to the connection end of said probe housing and adapted at the other end for connection to a wall of the cooking cavity, said probe housing and the cable shield thereby cooperating to form a continuous conductive sheath from the tip of said probe housing to the other end of said cable;
   c. an electrically-conductive reflector mounted at a fixed position on said conductive sheath a predetermined distance from the tip end of said probe housing; and
   d. an indicator on said probe housing to show the minimum recommended insertion depth of said probe housing into the food, said minimum insertion depth indicator located between said reflector and the probe tip a predetermined distance from said reflector.

2. A probe assembly according to claim 1, wherein said reflector is generally disc-shaped.

3. A probe assembly according to claim 2, wherein said reflector is positioned approximately ⅞ λ from the probe tip, where λ is the wavelength of the microwave energy.

4. A probe assembly according to claim 1, wherein said reflector has a diameter of approximately 1.6 inches and said indicator is located approximately 2 inches from said reflector.

5. A probe assembly according to claim 1, wherein said indicator comprises an enlargement in diameter of said housing, the larger diameter portion being formed from said indicator to said reflector.

6. A temperature-sensing probe assembly for monitoring the internal temperature of food being cooked in the cooking cavity of a microwave oven, said probe assembly comprising:
   a. a probe adapted for insertion into food to be cooked, said probe including an elongated conductive housing, the tip end of which is closed and shaped to facilitate insertion into the food, and said probe further including a temperature-sensing electrical element positioned internally of the housing near the tip end;
   b. a flexible shielded cable for connecting said electrical element to circuitry responsive to thermally-induced changes in a characteristic of said electrical element, the cable shield being electrically connected at one end to the connection end of said probe housing and adapted at the other end for connection to a wall of the cooking cavity;
   c. an electrically-conductive reflector, said reflector being disc-shaped with a greater thickness in the center of the disc, said reflector having an axial bore, and said reflector having a tubular attachment portion extending outwardly from a first side of said reflector in axial alignment with said reflector bore, said tubular attachment portion being attached by swaging to said probe housing;
   d. an insulative handle having a gripping portion for manual manipulation and a radial sealant injection hole communicating between the outer surface of said handle and a portion of the axial bore; and
   e. means for holding said reflector and said handle together with the axial bore of said reflector in alignment with the axial bore of said handle to form an integral probe and reflector assembly.

7. The probe assembly of claim 6, wherein said means for holding said handle and said reflector together comprises a cavity in said reflector and a mating projection on said handle.

8. The probe assembly of claim 6 further comprising an indicator on said probe housing to show the minimum recommended insertion depth of said probe housing into the food, said minimum insertion depth indicator located between said reflector and the probe tip a predetermined distance from said reflector.

* * * * *